United States Patent
Yasutomi

(10) Patent No.: US 10,839,534 B2
(45) Date of Patent: Nov. 17, 2020

(54) IMAGING PROCESSING APPARATUS, IMAGE PICKUP APPARATUS, CONTROL METHOD FOR IMAGE PROCESSING APPARATUS, AND STORAGE MEDIUM

(71) Applicant: CANON KABUSHIKI KAISHA, Tokyo (JP)

(72) Inventor: Takeshi Yasutomi, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 106 days.

(21) Appl. No.: 16/180,934

(22) Filed: Nov. 5, 2018

(65) Prior Publication Data

US 2019/0139239 A1  May 9, 2019

(30) Foreign Application Priority Data

Nov. 8, 2017  (JP) ................. 2017-215912

(51) Int. Cl.
  *G06T 7/33* (2017.01)
  *G06T 3/00* (2006.01)
  *G06T 5/50* (2006.01)
  *G03B 3/00* (2006.01)

(52) U.S. Cl.
  CPC ............... *G06T 7/337* (2017.01); *G03B 3/00* (2013.01); *G06T 3/0075* (2013.01); *G06T 5/50* (2013.01); *G06T 2200/21* (2013.01); *G06T 2207/10148* (2013.01); *G06T 2207/20212* (2013.01); *G06T 2207/20221* (2013.01)

(58) Field of Classification Search
  CPC . G06T 2207/20221; G06T 2207/10148; G06T 5/50; G06T 2200/21; G06T 2207/20212; G06T 3/0075; G06T 7/337; H04N 5/232133; H04N 5/23229; H04N 5/23216; H04N 5/232122; H04N 5/232933; G03B 3/00
  See application file for complete search history.

(56) References Cited

U.S. PATENT DOCUMENTS 9,210,320 B2 *  12/2015  Suzuki ............... G06K 9/00255
9,456,129 B2 *  9/2016  Kawai ................ H04N 5/23293
(Continued)

FOREIGN PATENT DOCUMENTS

JP  10-290389 A  10/1998
JP  2008-271240 A  11/2008

*Primary Examiner* — Yon J Couso
(74) *Attorney, Agent, or Firm* — Canon U.S.A., Inc. IP Division

(57) ABSTRACT

Some embodiments of an image processing apparatus comprise a processor to execute instructions. The instructions are for detecting feature points from images in a first plurality of images that at least partially overlap in angle of view and have different focus positions and from at least one second image, calculating a first conversion coefficient from the feature points, combining the images in the first plurality of images based on the first conversion coefficient, calculating a second conversion coefficient for at least a part of the images in the first plurality of images by using the feature points detected from the second image, and combining the at least a part of the images in the first plurality of images by using the second conversion coefficient, wherein a depth of field in the second image is deeper than a respective depth of field in each image in the first plurality of images.

15 Claims, 7 Drawing Sheets

(56) References Cited

U.S. PATENT DOCUMENTS

2008/0259176 A1* 10/2008 Tamaru ............... H04N 5/2356
   348/222.1
2014/0226041 A1* 8/2014 Eguchi ............... H04N 5/23212
   348/239
2014/0253760 A1* 9/2014 Watanabe ............ H04N 5/265
   348/239
2015/0358542 A1* 12/2015 Sato .................... H04N 5/2258
   348/239

* cited by examiner

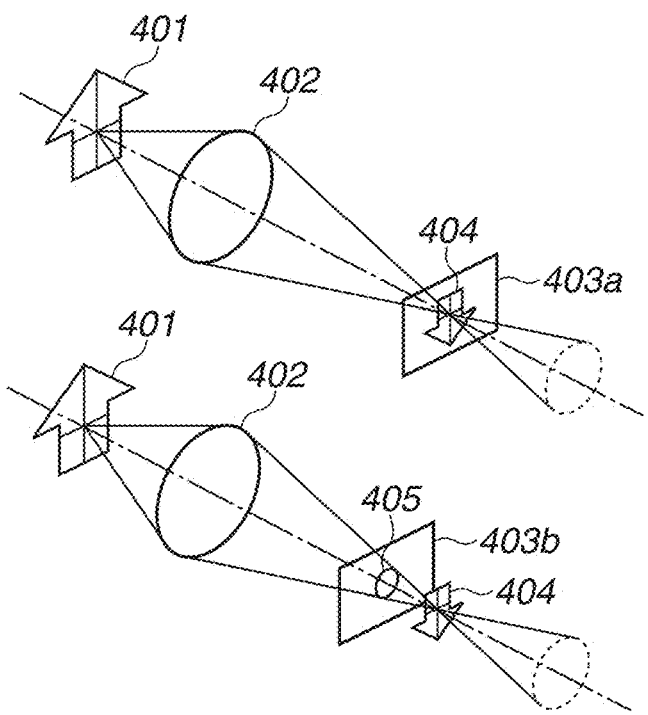
FIG.4A
FIG.4B
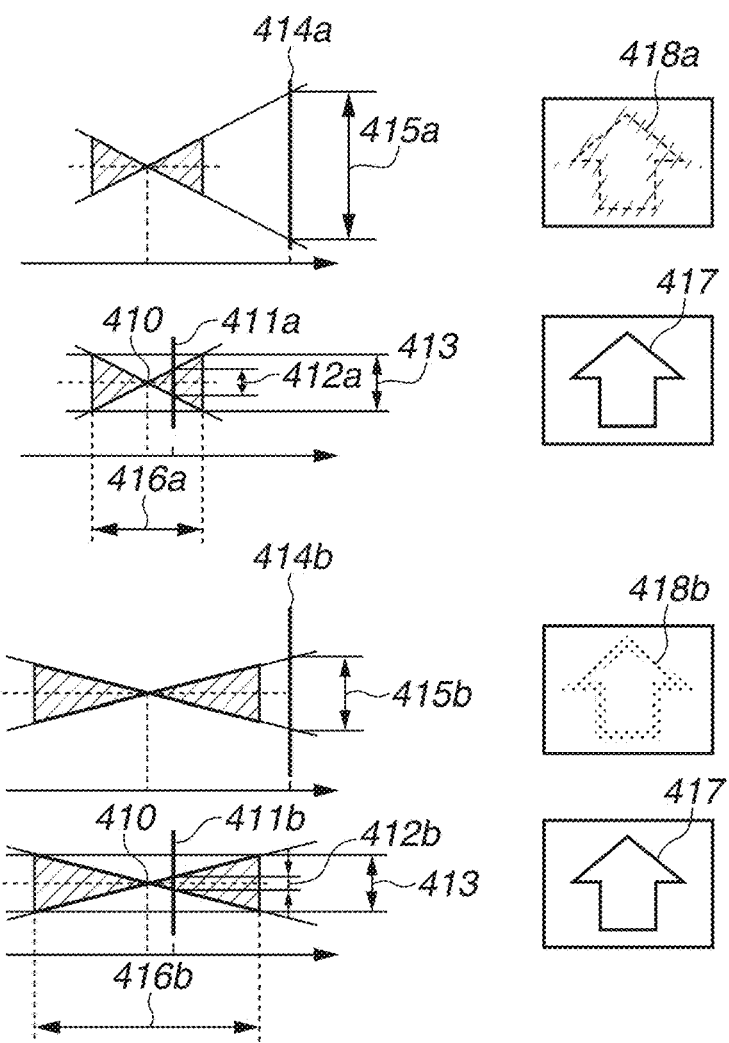
FIG.4C
FIG.4D

IMAGING PROCESSING APPARATUS, IMAGE PICKUP APPARATUS, CONTROL METHOD FOR IMAGE PROCESSING APPARATUS, AND STORAGE MEDIUM

BACKGROUND

Field of the Disclosure

The present disclosure relates to an image processing apparatus for performing alignment on a plurality of images.

Description of the Related Art

When capturing a plurality of subjects at largely different distances from an image processing apparatus, such as a digital camera, or when capturing a subject which is long in the depth direction, parts of the subjects may not be in focus because of an insufficient depth of field. Japanese Patent Application Laid-Open No. H10-290389 discloses a focus bracketing technique. The technique captures a plurality of images with different focus positions, extracts only in-focus areas from these images, and combines the in-focus areas into one image to generate a combined image in which the entire imaging area is in focus. To correctly utilize this focus bracketing technique, correct alignment between images is essential. Japanese Patent Application Laid-Open No. 2008-271240 discusses a method for detecting feature points in a plurality of images, performing alignment of these images by using the detected feature points, and then combining the images. A certain method for detecting feature points utilizes the standard deviation of luminance.

However, if an alignment method discussed in Japanese Patent Application Laid-Open No. 2008-271240 is used, the following situations may arise.

If a plurality of images is captured with focus positions differentiated by reducing the depth of field, it is highly likely that an in-focus subject area may differ for each image. Therefore, feature points can be detected only from a different subject area for each image, making it difficult to perform the alignment between images based on feature points. Particularly in the case of images used for focus bracketing discussed in Japanese Patent Application Laid-Open No. 1110-290389, the depth of field may be comparatively shallow, making it impossible to perform the alignment.

SUMMARY

Some of the embodiments that are described herein provide an image processing apparatus capable of performing high-accuracy alignment on a plurality of images in which feature points are detected in different subject areas.

Some embodiments provide an image processing apparatus including at least one memory configured to store instructions, and at least one processor in communication with the at least one memory and configured to execute the instructions to detect feature points from images in a first plurality of images that at least partially overlap in angle of view and have different focus positions and from at least one second image, calculate a first conversion coefficient from the feature points, combine the images in the first plurality of images based on the first conversion coefficient, calculate a second conversion coefficient of at least a part of the images in the first plurality of images by using the feature points detected from the at least one second image, and combine the at least a part of the images in the first plurality of images by using the second conversion coefficient, wherein a depth of field of the at least one second image is deeper than a respective depth of field in each image in the first plurality of images.

Further features of some embodiments will become apparent from the following description of exemplary embodiments with reference to the attached drawings.

BRIEF DESCRIPTION OF THE DRAWINGS

FIGS. 4A, 4B, 4C, and 4D are diagrams illustrating states where subject images are formed on an image forming plane according to the exemplary embodiment.

DESCRIPTION OF THE EMBODIMENTS

Exemplary embodiments will be described in detail below with reference to the accompanying drawings.

Figure 1:
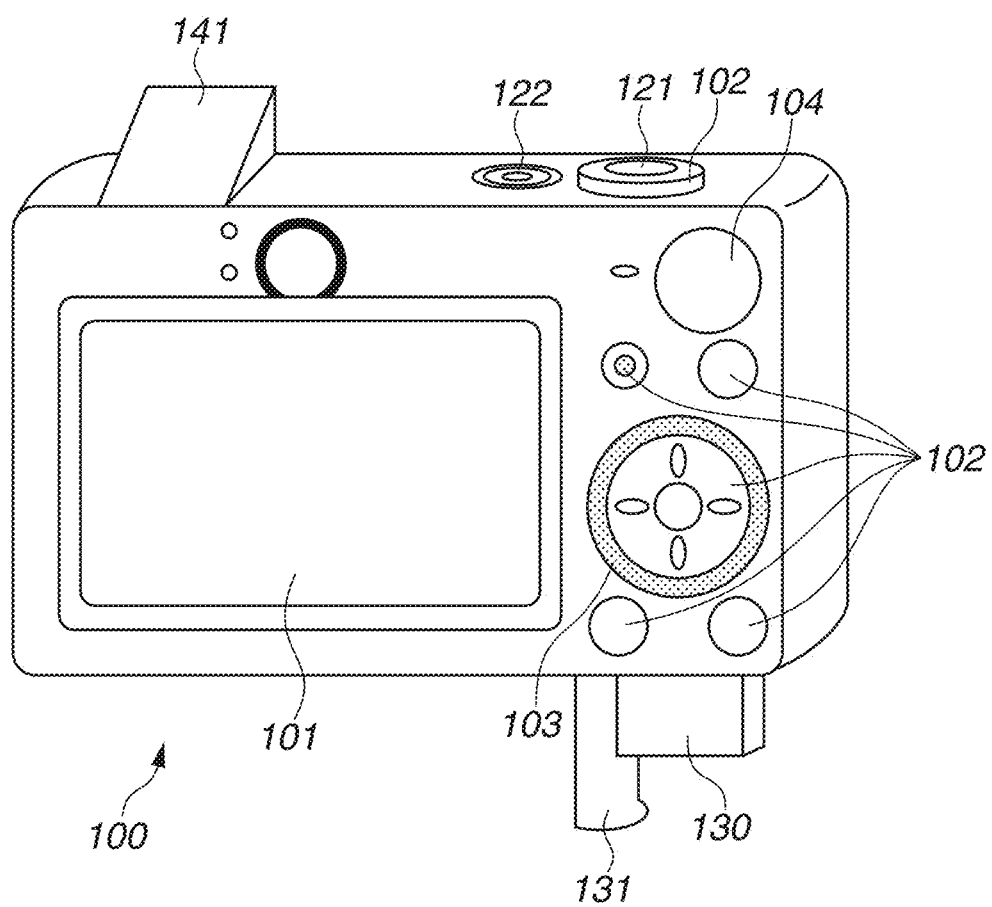
FIG. 1 is a back-perspective view schematically illustrating a configuration of a digital camera according to an exemplary embodiment.

FIG. 1 is a back-perspective view schematically illustrating a configuration of a digital camera according to an exemplary embodiment.

The back panel of a digital camera 100 is provided with a display unit 101 for displaying an image and various information, and an operation unit 102 including switches, buttons, and other operation members for receiving various user operations. The back panel of the digital camera 100 is also provided with a mode selection switch 104 for changing the imaging mode, and a controller wheel 103 enabling rotating operations. The top face of the digital camera 100 is provided with a shutter button 121 for issuing an imaging instruction, a power switch 122 for turning power of the digital camera 100 ON and OFF, and a flash unit 141 for irradiating a subject with flashlight.

The digital camera 100 is connectable with an external apparatus via wired or wireless communication and is capable of outputting image data (still image data and moving image data) to the external apparatus. The bottom face of the digital camera 100 is provided with a recording medium slot (not illustrated) which can be opened and closed by a cover 131. A recording medium 130, such as a memory card, can be inserted into and removed from the recording medium slot.

The recording medium 130 stored in the recording-medium slot can communicate with a system control unit 210 (refer to FIG. 2) of the digital camera 100. The recording medium 130 is not limited to a memory card which can be inserted into and removed from the recording medium slot, and may be an optical disk and a magnetic disk, such as a hard disk. The recording medium 130 may be built in the main unit of the digital camera 100.

Figure 2:
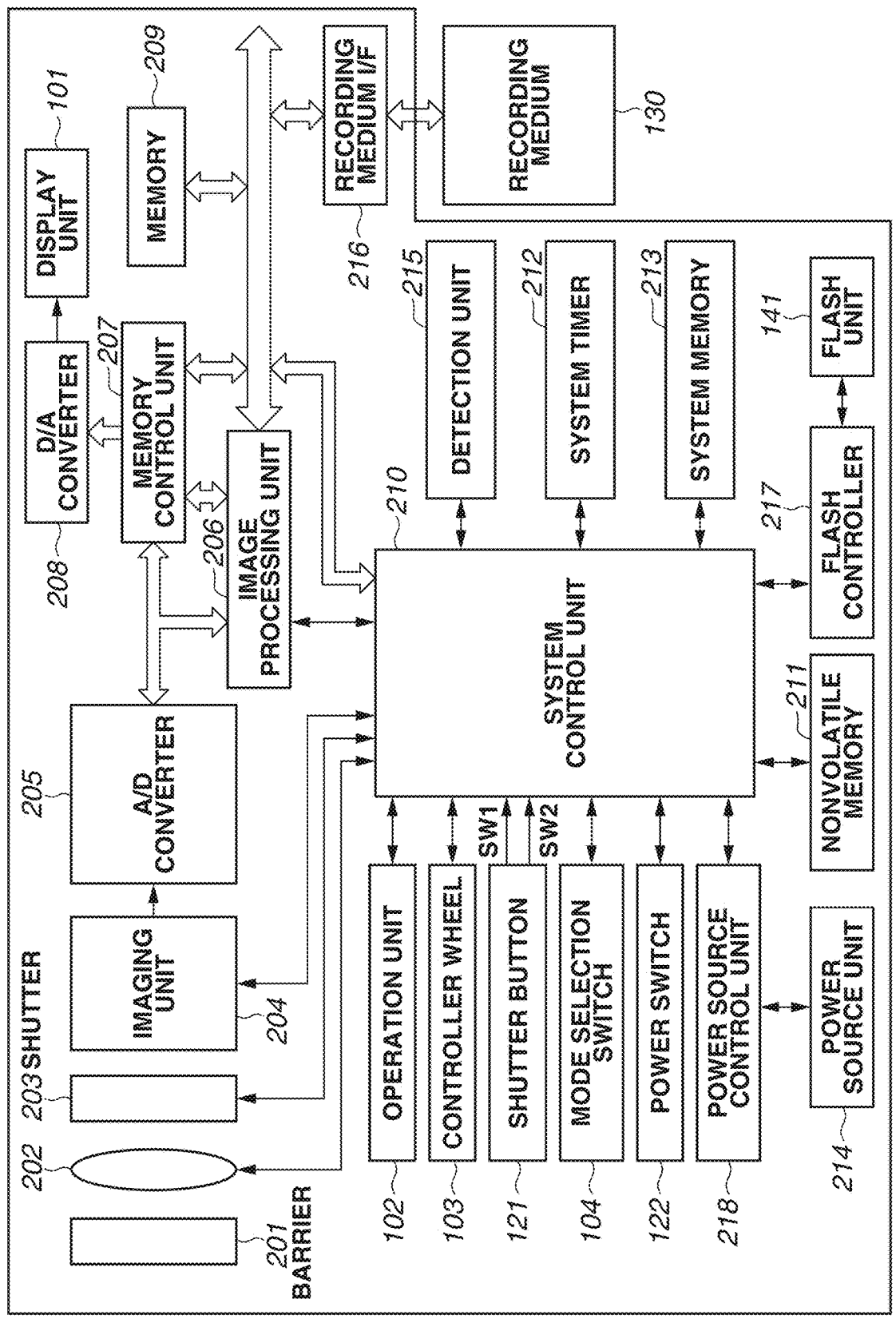
FIG. 2 is a block diagram illustrating a hardware configuration of the digital camera according to the exemplary embodiment.

FIG. 2 is a block diagram illustrating a hardware configuration of the digital camera 100. The digital camera 100 includes a barrier 201, an imaging lens 202, a shutter 203, and an imaging unit 204. The barrier 201 covers an imaging optical system to prevent the imaging optical system from being stained and damaged. The imaging lens 202 formed by a lens group including a zoom lens and a focal lens forms the imaging optical system. The shutter 203 has a diaphragm function for adjusting the exposure amount for the imaging unit 204. The imaging unit 204 is an image sensor for converting optical image into an electric signal (analog signal). For example, the imaging unit 204 is a charge coupled device (CCD) sensor or a complementary metal oxide semiconductor (CMOS) sensor having the Bayer array structure in which red, green, and blue (RGB) pixels are regularly arranged. The shutter 203 may be a mechanical shutter or an electronic shutter which controls the reset timing of the image sensor to control the accumulation time.

If the imaging unit 204 has a structure in which one pixel is provided with a plurality of photoelectric converters to enable acquiring a stereo image, automatic focus detection (AF) processing can be more quickly performed.

Figure 3:
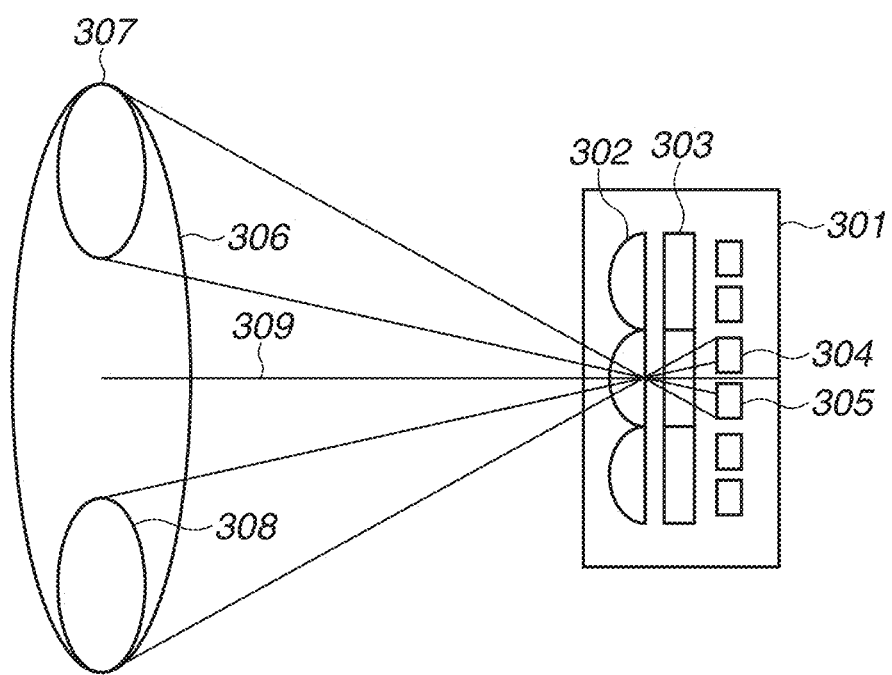
FIG. 3 is a diagram illustrating a state where a light signal is incident to a pixel having a plurality of photoelectric converters according to the exemplary embodiment.

FIG. 3 illustrates a state where a light signal is incident to a pixel having a plurality of photoelectric converters according to the present exemplary embodiment.

Referring to FIG. 3, the pixel array 301 includes micro lenses 302, color filters 303, and photoelectric converters 304 and 305. The photoelectric converters 304 and 305 belong to the same pixel and correspond to a common micro lens 302 and a common color filter 303. FIG. 3 illustrates a state where the two photoelectric converters 304 and 305 corresponding to one pixel are laterally arranged when viewed from the top of the digital camera 100. The light flux on the upper side of an optical axis 309 (equivalent to the light flux from an area 307) out of the light fluxes emitted from an exit pupil 306 is incident to the photoelectric converter 305. The light flux on the lower side of the optical axis 309 (equivalent to the light flux from an area 308) out of the light fluxes emitted from the exit pupil 306 is incident to the photoelectric converter 304. More specifically, the photoelectric converters 304 and 305 receive light from different areas of the exit pupil 306 of the imaging lens. Assume that the signal received by the photoelectric converter 304 is an image A, and the signal received by the photoelectric converter 305 is an image B. The images A and B make it possible to calculate the focus shift amount based on the phase difference between a pair of pupil division images and acquire distance information. In particular, if pixels that each have two photoelectric converters are arranged over the entire image sensor, the image sensor can acquire distance information of the subject at arbitrary positions on the screen.

However, the above-described distance information can also be acquired by using an image sensor having ordinary pixels instead of pixels that each have two photoelectric converters. For example, the imaging unit 204 generates a plurality of images with different focus positions while changing the relative positions of a plurality of lenses. An image processing unit 206 (described below) divides each image into blocks and calculates the contrast of each division block. The image processing unit 206 compares the contrast of blocks at the same position of a plurality of captured images and determines a block having the highest contrast as an in-focus block. As the last, the image processing unit 206 obtains distance information of each block from the focus position of the image where the in-focus block is captured.

The digital camera 100 includes an analog-to-digital (A/D) converter 205, an image processing unit 206, a memory control unit 207, a digital-to-analog (D/A) converter 208, a memory 209, and a system control unit 210. When the imaging unit 204 outputs an analog signal to the A/D converter 205, the A/D converter 205 converts the acquired analog signal into image data composed of a digital signal and outputs the image data to the image processing unit 206 or the memory control unit 207.

The image processing unit 206 performs correction processing (pixel interpolation and shading correction), white balance processing, gamma correction processing, and color conversion processing on the image data acquired from the A/D converter 205 and the data acquired from the memory control unit 207. The image processing unit 206 implements the electronic zoom function by performing image clipping and zooming processing. The image processing unit 206 also performs predetermined calculation processing by using the image data of captured images. The system control unit 210 performs exposure control and ranging control based on the calculation result obtained in this way. For example, the system control unit 210 performs automatic exposure (AE) processing, automatic focusing (AF) processing, and Electronic Flash Preliminary Emission (EF) processing based on the Through the Lens (TTL) method. The image processing unit 206 performs predetermined calculation processing by using the image data of captured images. The system control unit 210 performs automatic white balance (AWB) processing based on the TTL method by using the calculation result obtained.

The image processing unit 206 includes an image combination processing circuit for combining a plurality of images to form a panorama image and determining the combination result. The image combination processing circuit is capable of performing not only a simple average combination but also comparison lighten composition and comparison darken composition for generating one piece of image data by selecting a pixel having the brightest or darkest value in each area of combination target image data. The image combination processing circuit also evaluates and determines the combination result based on a specific criterion. For example, if the number of combined images does not satisfy a predetermined number or when the length of an image after the combination does not satisfy a reference value, it is determined that the combination failed. The digital camera 100 may be configured to implement the image combination processing function through software processing by the system control unit 210 instead of a configuration including the image processing unit 206.

The image data output from the A/D converter 205 is written in the memory 209 via the image processing unit 206 and the memory control unit 207 or via the memory control unit 207. The memory 209 also serves as an image display memory (video memory) for storing image data to be displayed on the display unit 101. The memory 209 has a storage capacity for storing a predetermined number of still images and panorama images (wide angle images) and a panorama image combination result. The system control unit 210 can also use the memory 209 as a work area for loading a program read from a nonvolatile memory 211.

The image display data (digital data) stored in the memory 209 is sent to the D/A converter 208. When the D/A converter 208 converts the received digital data into an analog signal and supplies the analog signal to the display unit 101, an image is displayed on the display unit 101. The display unit 101, which is a liquid crystal display (LCD) or an organic electroluminescence (EL) display, displays an image based on the analog signal received from the D/A converter 208. The image display on the display unit 101 is turned ON and OFF by the system control unit 210. Turning the image data OFF enables reducing the power consumption. In addition, the system control unit 210 converts a digital signal (accumulated in the memory 209 from the imaging unit 204 via the A/D converter 205) into an analog signal via the D/A converter 208 and successively displays the analog signal on the display unit 101, thus achieving the electronic view finder function for displaying a through image.

The digital camera 100 includes the nonvolatile memory 211, a system timer 212, a system memory 213, a detection unit 215, and a flash controller 217. The nonvolatile memory 211, which is an electrically erasable programmable read only memory (EEPROM), stores programs to be executed by the system control unit 210 and operation constants. The nonvolatile memory 211 has an area for storing system information and an area for storing user setting information. When the digital camera 100 is activated, the system control unit 210 reads and restores various information and settings stored in the nonvolatile memory 211.

The system control unit 210 including a central processing unit (CPU) controls overall operations of the digital camera 100 by executing various program codes stored in the nonvolatile memory 211. Programs and operation constants and variables read from the nonvolatile memory 211 by the system control unit 210 are loaded into the system memory 213. A random access memory (RAM) is used as the system memory 213. The system control unit 210 further performs display control by controlling the memory 209, the D/A converter 208, and the display unit 101. The system timer 212 measures time used for various control and time of the built-in clock. The flash controller 217 controls the light emission of the flash unit 141 according to the brightness of the subject. The detection unit 215 including a gyroscope and sensors acquires angular velocity information and orientation information of the digital camera 100. The angular velocity information includes information about the angular velocity and angular acceleration at the time of panorama image capturing by the digital camera 100. The orientation information includes information about the inclination of the digital camera 100 with respect to the horizontal direction.

The display unit 101, the operation unit 102, the controller wheel 103, the shutter button 121, the mode selection switch 104, the power switch 122, and the flash unit 141 illustrated in FIG. 2 are similar to those described above with reference to FIG. 1.

Various operation members constituting the operation unit 102 are used, for example, to select various function icons displayed on the display unit 101. When a predetermined function icon is selected, the operation members are assigned context-sensitive functions. More specifically, the operation members of the operation unit 102 act as various functions buttons. The function buttons include an end button, a return button, an image feeding button, a jump button, a narrowing-down button, an attribute change button, and a DISP button. For example, pressing the menu button displays a menu screen for performing various settings on the display unit 101. The user can intuitively perform setting operations by using the menu screen displayed on the display unit 101, a four-direction button (including the up, down, right, and left buttons), and a SET button.

The controller wheel 103 as a rotatable operation member is used when specifying a selection item together with the four-direction button. When the controller wheel 103 is rotated, an electrical pulse signal according to the operation amount (rotation angle, number of rotations, etc.) is generated. The system control unit 210 analyzes this pulse signal to control each unit of the digital camera 100.

The shutter button 121 has a first switch SW1 and a second switch SW2. The first switch SW1 turns ON in the middle of the pressing operation (half press) of the shutter button 121. At this timing, an imaging preparation instruction signal is sent to the system control unit 210. Upon reception of the first switch SW1 ON signal, the system control unit 210 starts operations including AF processing, AE processing, AWB processing, and EF processing. The second switch SW2 turns ON upon completion of the pressing operation (full press) of the shutter button 121. At this timing, an imaging start instruction signal is sent to the system control unit 210. Upon reception of the second switch SW2 ON signal, the system control unit 210 performs a series of imaging operations ranging from signal reading from the imaging unit 204 to image data writing in the recording medium 130.

The mode selection switch 104 is a switch for changing the operational mode of the digital camera 100 between various modes such as the still image capturing mode, the moving image capturing mode, and the playback mode. The still image capturing mode includes the automatic image capturing mode and the panorama image capturing mode for forming a panorama image through panorama image capturing.

The digital camera 100 includes a power source unit 214 and a power source control unit 218. The power source unit 214 is a primary battery (such as an alkaline battery and a lithium battery), a secondary battery (such as a NiCd battery, a NiMH battery, and a Li battery), or an alternating current (AC) adaptor for supplying power to the power source control unit 218. The power source control unit 218 detects the presence or absence of a battery, the battery type, and the remaining battery capacity and, based on the detection result and the instruction of the system control unit 210, supplies required voltages to the recording medium 130 and other components for required time periods.

The digital camera 100 includes a recording medium interface (I/F) 216 for enabling communication between the recording medium 130 and the system control unit 210 when the recording medium 130 is loaded into the recording medium slot (not illustrated). The recording medium 130 has already been described in detail above with reference to FIG. 1, and a description thereof will be omitted.

Focus bracket will be briefly described below.

FIGS. 4A to 4D illustrate states where subject images are formed on an image forming plane according to an exemplary embodiment.

FIG. 4A illustrates a state where an image 404 of a subject 401 is formed on a plane 403a by an optical lens 402. More specifically, if the plane 403a and the image sensor surface of the image sensor coincide with each other, an image of the subject 401 is formed as a "point" on the plane 403a and then recorded as an in-focus image.

FIG. 4B illustrates a case where the image forming plane does not coincide with the image sensor surface. When an image sensor surface 403b is positioned at a position different from the plane 403a illustrated in FIG. 4A, the image 404 of the subject 401 formed by the optical lens 402 is projected on the image sensor surface 403b as a circle-of-confusion 405. In this case, when the circle-of-confusion 405 is smaller than a permissible circle-of-confusion of the image sensor, the circle-of-confusion 405 can be assumed to be equivalent to a "point" in the in-focus state, and an image equivalent to the in-focus image is obtained. On the other hand, when the circle-of-confusion 405 is larger than the permissible circle-of-confusion, an out-of-focus image is obtained on the image sensor surface 403*b*.

FIG. 4C illustrates the above-described state when viewed from the lateral side. When an image of the subject 401 is formed at a focus 410 and the image sensor surface exists at the position of a plane 411*a*, a circle-of-confusion diameter 412*a* is obtained. In this case, the circle-of-confusion diameter 412*a* is smaller than a permissible circle-of-confusion diameter 413 of the image sensor. Therefore, an image 417 recorded by the image sensor is an in-focus image. On the other hand, when the image sensor surface exists at the position of a plane 414*a*, a circle-of-confusion diameter 415*a* is larger than the permissible circle-of-confusion diameter 413. Therefore, an image 418*a* on the image sensor surface 414*a* is out of focus. The shaded area in which the circle-of-confusion diameter 412*a* is smaller than the permissible circle-of-confusion diameter 413 indicates a depth of focus 416*a*. The depth of focus 416*a* is converted into a value on the subject side to become the depth of field.

FIG. 4D illustrates a state where the diaphragm is reduced from the state illustrated in FIG. 4C. In the state where the diaphragm is reduced, the circle-of-confusion diameters 412*a* illustrated in FIG. 4C changes to a circle-of-confusion diameter 412*b* for the plane 411*b* illustrated in FIG. 4D, and the circle-of-confusion diameter 415*a* illustrated in FIG. 4C changes to become a circle-of-confusion diameter 415*b* for the plane 414*b* illustrated in FIG. 4D. In this case, the circle-of-confusion diameter 415*b* illustrated in FIG. 4D is smaller than the circle-of-confusion diameter 415*a* illustrated in FIG. 4C. Therefore, an image 418*b* obtained at this timing has less defocus amount than the image 418*a* and a depth of focus 416*b* at this timing is deeper than the depth of focus 416*a*.

Figure 5:
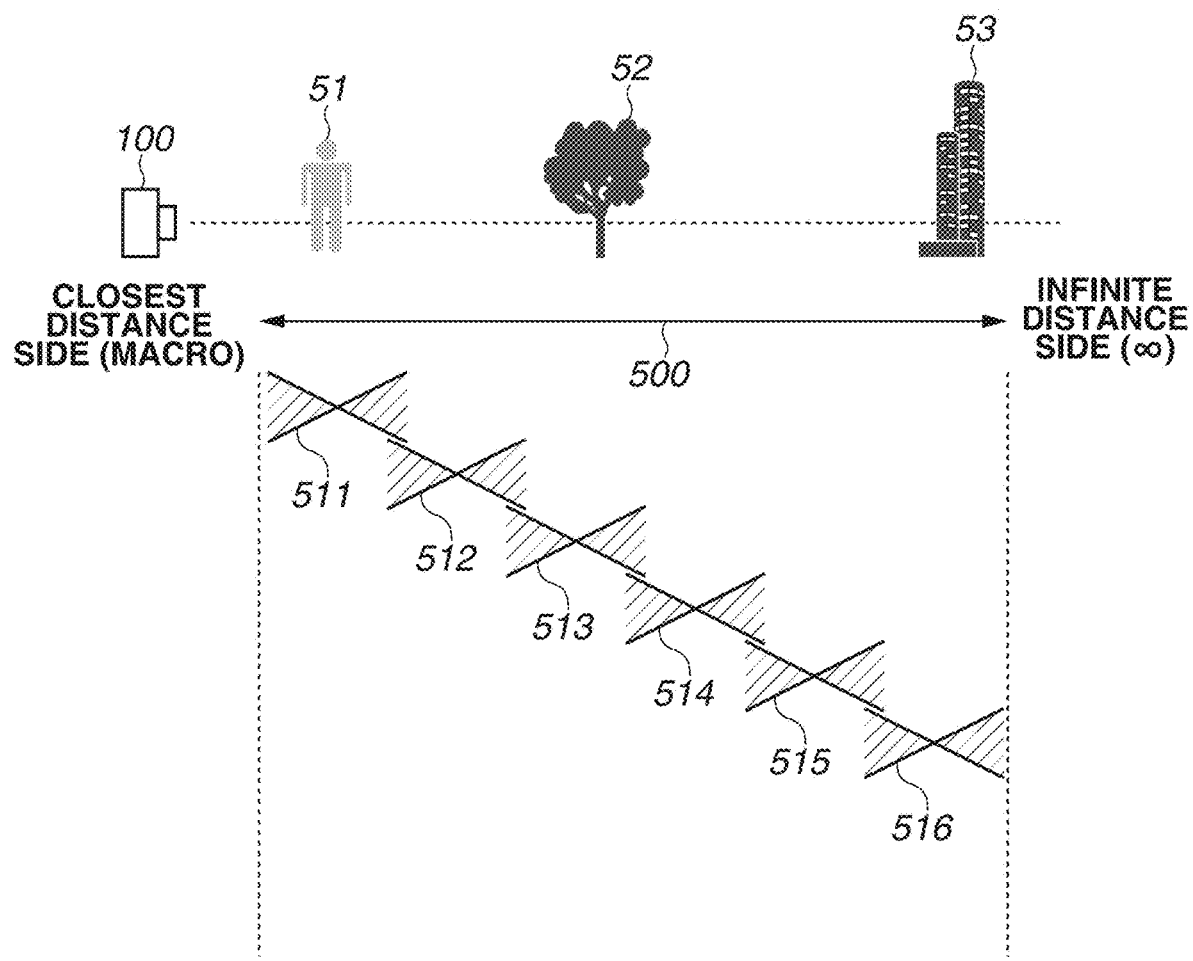
FIG. 5 is a diagram illustrating imaging for focus bracketing according to the exemplary embodiment.

FIG. 5 illustrates image capturing for focus bracketing according to an exemplary embodiment. In this case, subjects 51 to 53 are assumed to be subjected to focusing. Each of the subjects 51 to 53 exists at different distances (subject distances) from the digital camera 100, i.e., the subjects 51, 52, and 53 are positioned closer to the digital camera 100 in this order (in the direction from the near side to the far side). Not all of the subjects 51 to 53 can be put in the depth of field in one imaging due to the structure of the digital camera 100. The depth of field of each image may be reduced in order to obtain a higher perceived resolution. To obtain a focus bracket image in which all of a plurality of the subjects 51 to 53 are in focus, it is necessary to cover a focus range 500 subjected to focus bracket imaging (bracket range) with a plurality of depths of focus. Depths of focus 511 to 516 in respective imaging operations are arranged to cover the focus range 500. More specifically, when imaging is performed (six imaging operations are performed in this example) with different focus positions corresponding to the depths of focus 511 to 516, each of the subjects 51 to 53 in the focus range 500 is in focus in one respective image. Based on a plurality of images captured in this way, performing image combination on the areas in the depths of focus in respective imaging operations enables obtaining an image in which the entire focus range 500 (entire bracket area) is in focus.

However, in some cases of focus bracket image capturing, the depth of field is reduced in order to obtain an image with high perceived resolution, as described above. When capturing an image with a shallow depth of field, the entire image may become out of focus. Accordingly, the degree of matching between images in areas for feature point detection decreases, possibly making it difficult to perform the alignment. To address this, when the system control unit 210 according to some embodiments determines that the depth of field is shallower than a predetermined threshold value, the system control unit 210 instructs the imaging unit 204 to capture images for feature point detection in addition to images for combination.

Figure 6:
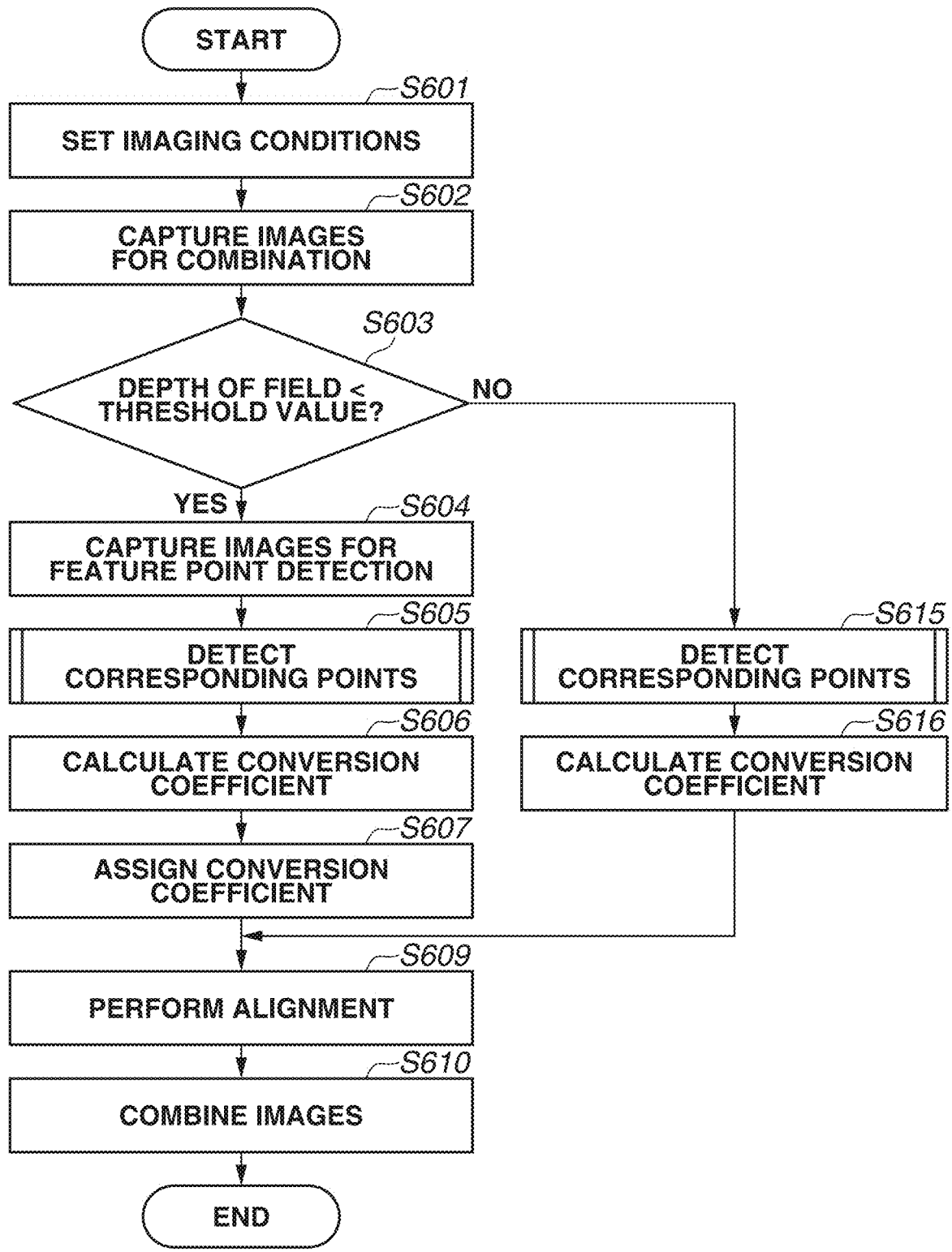
FIG. 6 is a flowchart illustrating processing for combining images according to the exemplary embodiment.

FIG. 6 is a flowchart illustrating processing for combining images according to an exemplary embodiment.

In S601, the system control unit 210 sets imaging conditions according to user's inputs or default settings. The imaging conditions include the number and focus positions of images for combination. For example, the user specifies an in-focus position via the display unit 101 also serving as a touch panel and specifies a plurality of focus positions at equal intervals before and after the focus position equivalent to the in-focus position in the optical axis direction. Alternatively, the user may specify two positions via the display unit 101 also serving as the touch panel and may set focus positions at equal intervals between these two positions. The system control unit 210 may increase the number of focus positions (the number of images for combination) in consideration of the processing load. Although the larger number of focus positions provides a higher image quality of a focus bracket image, it is necessary to determine the number of focus positions in consideration of the processing load. In addition, the system control unit 210 determines the order of imaging according to the order of distance of the set focus positions.

In S601, the system control unit 210 sets the depth of field for image capturing according to each focus position. The depth of field may need to be set so that the entire bracket range can be covered, as illustrated in FIG. 5. However, as described above, it is desirable to reduce the depth of field of each image as much as possible to improve the perceived resolution. More specifically, it is desirable for the system control unit 210 to set the depth of field of each image as shallow as possible so that the entire bracket range can be covered.

In S601, the system control unit 210 also sets the International Organization for Standardization (ISO) sensitivity and shutter speed in addition to the focus position and depth of field.

In S602, the imaging unit 204 sequentially captures images to be subjected to combination for the same angle of view with the set focus positions.

In S603, the system control unit 210 compares the depth of field of each image captured by the imaging unit 204 in S602 with a predetermined threshold value. If the depth of field of the captured image is shallower than the threshold value (YES in S603), the processing proceeds to S604. If a plurality of the images captured in S602 have different respective depths of field, the system control unit 210 may compare the shallowest one of the depths of field with the above-described threshold value.

If the depth of field of the captured images for combination is shallower than the threshold value (YES in S603), the system control unit 210 determines that the alignment accuracy is low only by detecting feature points from the images for combination. Then, in S604, the imaging unit 204 recaptures images for feature point detection. For example, the imaging unit 204 captures two images for feature point detection with focus positions more on the closest distance and the infinite distance sides with respect to the focus positions of the images for combination. In particular, the imaging unit 204 captures two images for feature point detection on the closest distance and the infinite distance sides of the optical system of the digital camera 100. Since images for feature point detection are used only for feature point detection, it is desirable to capture these images with a deeper depth of field to prevent the images from being out of focus. Although the present exemplary embodiment will be described below on the premise that two images for feature point detection are to be captured, the number of images is not limited thereto. Particularly when high-accuracy correction is required, the number of images for feature point detection may be increased. Although, in the present exemplary embodiment, the imaging unit 204 captures images for feature point detection on the closest distance and the infinite distance sides of the focus range 500, the number of images is not limited thereto. Images for feature point detection may be captured with arbitrary focus positions as long as the depth of field is sufficient for feature point detection. In particular, when capturing images for feature point detection, the imaging unit 204 may capture one image for feature point detection. In this case, the system control unit 210 calculates a conversion coefficient by using the image for feature point detection and any one of images for combination and assigns the conversion coefficient to other images for combination. In addition, in the flowchart illustrated in FIG. 6, an image for feature point detection may not necessarily be captured after capturing images for combination. In this case, the system control unit 210 needs to compare the depth of field with a threshold value before capturing images for combination.

On the other hand, when the depth of field of the captured images for combination is not shallower than the threshold value (NO in S603), the system control unit 210 does not capture images for feature point detection. Then, the processing proceeds to S615.

In S605, the system control unit 210 detects corresponding points.

Figure 7:
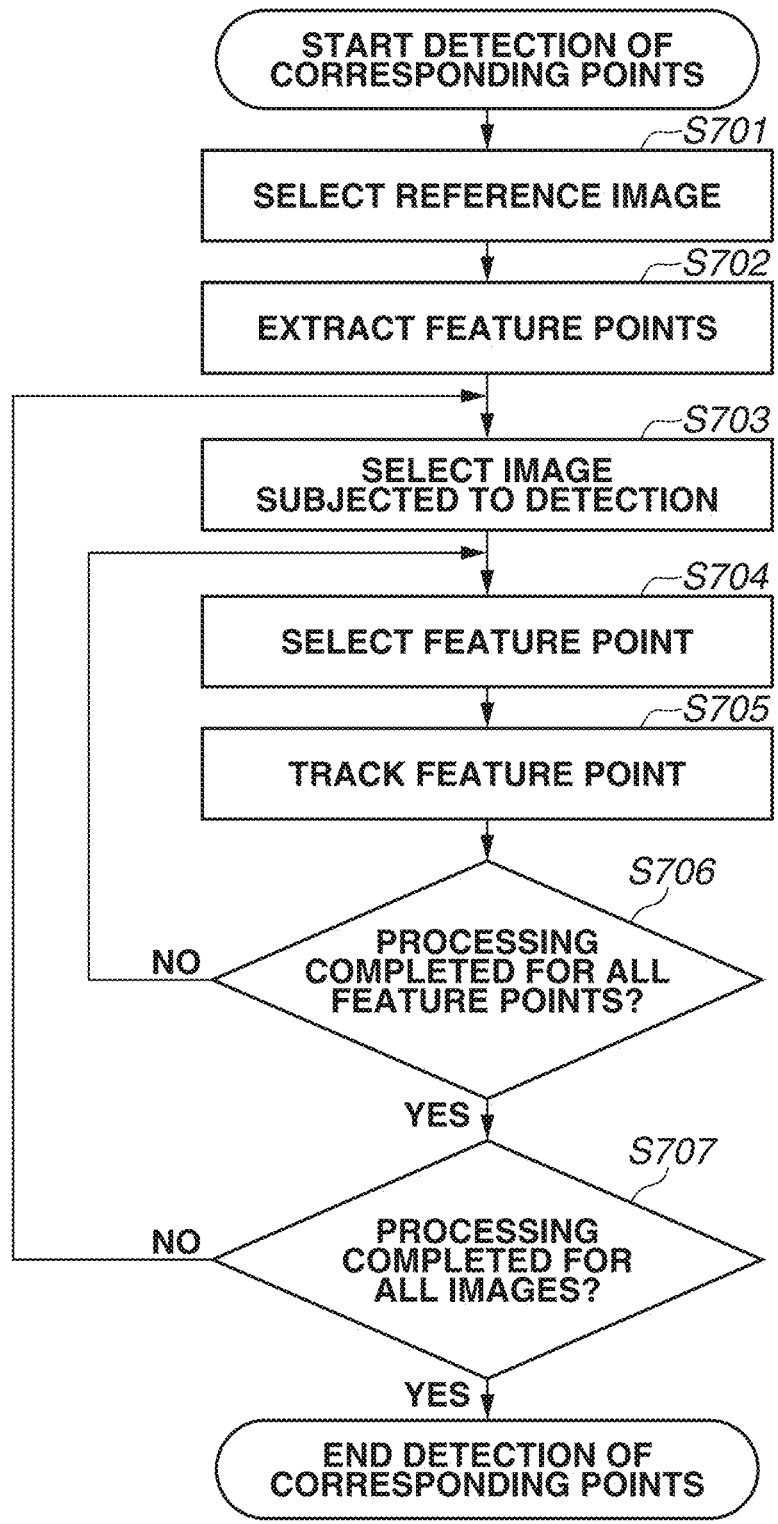
FIG. 7 is a flowchart illustrating processing for detecting corresponding points according to the exemplary embodiment.

FIG. 7 is a flowchart illustrating processing for detecting corresponding points according to some embodiments.

In S701, the system control unit 210 selects a reference image from images to be used for feature point detection. When the imaging unit 204 recaptures images for feature point detection in 604, the system control unit 210 selects a reference image from the images for feature point detection captured in S604.

In S702, the system control unit 210 extracts feature points from the reference image. There are various methods for extracting feature points. For example, when the standard deviation of luminance in a predetermined area centering on a certain point exceeds a predetermined value, the system control unit 210 extracts the point as a feature point. Increasing the number of feature points extracted improves the processing accuracy and at the same time increases the processing load. Therefore, it is desirable that the number of feature points can be predetermined according to the performance of hardware such as the system control unit 210.

In S703, the system control unit 210 selects an image subjected to detection from the images to be used for feature point detection other than the reference image. For example, according to the present exemplary embodiment, when the imaging unit 204 captures two images for feature point detection in S604, the image other than the reference image is used as an image subjected to detection. If there is a plurality of images to be used for feature point detection other than the reference image, in S703, the system control unit 210 sequentially selects these images as images subjected to detection.

After selecting an image subjected to detection in S703, then in S704, the system control unit 210 selects a tracking target feature point from the feature points of the reference image which have not yet undergone the tracking processing in S705 (described below).

In S705, the system control unit 210 tracks the selected feature point. In the image subjected to detection selected in S703, the system control unit 210 searches for a point corresponding to the feature point selected in S704. As an example of a search method, the system control unit 210 sets as a search range the predetermined range centering on the same position as the feature point selected in the image subjected to detection in S704. The system control unit 210 calculates a corresponding point where a Sum of Absolute Difference (hereinafter referred to as SAD) in luminance from the feature point is minimized in the search range. Assuming that this point is a point corresponding to the feature point, the memory 209 stores the correspondence relation before image deformation processing (described below). In the above-described corresponding point calculation, the system control unit 210 may also use Sum of Squared Difference (hereinafter referred to as SSD) or Normalized Cross Correlation (hereinafter referred to as NCC) in addition to, or in alternative to, SAD.

In S706, the system control unit 210 determines whether tracking processing is completed for all of the feature points of the reference image. If the processing is completed for all of the feature points (YES in S706), the processing proceeds to S707. On the other hand, when the processing is not completed for all of the feature points (NO in S706), the processing returns to S704. In S704, the system control unit 210 selects a processing target feature point from the feature points which have not yet undergone the tracking processing.

In S707, the system control unit 210 determines whether the tracking processing is completed for all of the feature points extracted from the reference image for all of the images subjected to detection. If the tracking processing is completed for all of the feature points and for all of the images subjected to detection (YES in S707), the processing ends the flowchart illustrated in FIG. 7. On the other hand, when the processing is not completed for all of the images subjected to detection (NO in S707), the processing returns to S703. In S703, the system control unit 210 selects from the images subjected to detection an unprocessed image as a processing target image.

This completes the description of the processing for detecting corresponding points in S605. The processing for detecting corresponding points in S615 is similar to the processing in S605. However, in S615, the imaging unit 204 has not captured images for feature point detection—the system control unit 210 extracts feature points from the images for combination captured in S602. After extracting feature points in S615, then in S616, the system control unit 210 calculates the conversion coefficient of the images for combination by using the corresponding feature points extracted in S615. In S615, the system control unit 210 sets one of the images for combination as a reference image and extracts corresponding feature points from other images for combination for the feature points extracted from the reference image. Specific extraction methods include the above-described SAD, SSD, and NCC.

In S606, the system control unit 210 calculates a conversion coefficient by using the corresponding points detected in S605. In the conversion coefficient calculation, the system control unit 210 calculates a coefficient to be used to perform conversion for matching the position of the point tracked in S705 corresponding to each of the feature points extracted in S702 with the position of each feature point. Conversion refers to one or a plurality of known conversion methods including translation, rotation, and enlargement/reduction. Generally, the system control unit 210 calculates as a conversion coefficient a coefficient to be used to perform conversion processing in a shortest distance so that the positions of the corresponding points (feature points and points of the image subjected to detection corresponding to the feature points) detected in S605 are matched.

The known affine coefficient can be used as an example of a conversion coefficient. The following Formula 1 indicates that the feature point of coordinates (x, y) is converted into coordinates (x', y') by the affine transformation, and the matrix A indicates the affine coefficient.

[Formula 1]

$$I' = \begin{pmatrix} x' \\ y' \\ 1 \end{pmatrix} = AI = \begin{pmatrix} a & b & c \\ d & e & f \\ 0 & 0 & 1 \end{pmatrix} \begin{pmatrix} x \\ y \\ 1 \end{pmatrix}$$ (Formula 1)

The matrix A indicating the affine coefficient can be calculated if the coordinates of three different feature points before and after the transformation are known. For example, the coordinates of three feature points not positioned on a straight line before and after the transformation are (x1, y1) and (u1, v1), (x2, y2) and (u2, v2), and (x3, y3) and (u3, v3), respectively. Simultaneously solving the following Formulas 2 and 3 enables calculating the affine coefficient.

[Formula 2]

$$\begin{pmatrix} x1 & y1 & 1 \\ x2 & y2 & 1 \\ x3 & y3 & 1 \end{pmatrix} \begin{pmatrix} a \\ b \\ c \end{pmatrix} = \begin{pmatrix} u1 \\ u2 \\ u3 \end{pmatrix}$$ (Formula 2)

[Formula 3]

$$\begin{pmatrix} x1 & y1 & 1 \\ x2 & y2 & 1 \\ x3 & y3 & 1 \end{pmatrix} \begin{pmatrix} d \\ e \\ f \end{pmatrix} = \begin{pmatrix} v1 \\ v2 \\ v3 \end{pmatrix}$$ (Formula 3)

However, the affine coefficient cannot be calculated when the three feature points are positioned on a straight line or are positioned at mutually very close positions. When there are four or more feature points not positioned on a straight line and not positioned at mutually very close positions, the system control unit 210 normalizes the feature points by using the least-square method.

In the conversion coefficient calculation in S616, a method based on the known affine coefficient, such as a method described above, may be used. For example, by using the reference image determined in S615 as the reference, the system control unit 210 calculates the affine coefficient by using Formulas 2 and 3 based on the extracted corresponding feature points. Then, in S609, the system control unit 210 performs alignment by using the calculated affine coefficient.

In S607, the system control unit 210 assigns a conversion coefficient to images for which the conversion coefficient was not calculated.

A specific embodiment of an assignment method will be described below centering on an example where the affine coefficient is assigned to an image captured with a focus position p3 between focus positions p1 and p2 of two images for which the affine coefficient has been calculated. Assume that an affine coefficient of the image captured with the focus position p1 is A1, an affine coefficient of the image captured with the focus position p2 is A2, and an affine coefficient to be assigned to the image captured with the focus position p3 is A3. If an affine coefficient of the image captured with the focus position p2 with reference to the image captured with the focus position p1 is expressed as A21, Formula 4 holds true.

$$A2 = A21 * A1$$ (Formula 4)

Formula 4 can be solved for the affine coefficient A21 by calculating the inverse matrix of the affine coefficient A1. Based on the positional relationship between the focus positions p1, p2, and p3, it is possible to calculate an affine coefficient A31 of the image captured with the focus position p3 with reference to the image captured with the focus position p1. For example, if the focus position p3 exists exactly in the middle between the focus positions p1 and p2, each of elements a to f of the affine coefficient A31 is a half of each element of the affine coefficient A21. Finally, by using the following Formula 5, the system control unit 210 assigns the affine coefficient A3 to the image captured with the focus position p3.

$$A3 = A31 * A1$$ (Formula 5)

In S609, the system control unit 210 performs the alignment based on the conversion coefficient corresponding to the images for combination. For example, the system control unit 210 can perform the alignment by using Formula 1.

In S610, the system control unit 210 performs the combination processing on the images having undergone the alignment. In the combination processing, the system control unit 210 extracts in-focus positions of respective images and then combines the images to generate a combined image in which the entire image is in focus. When using an image sensor formed by pixels each having a plurality of photoelectric converters as illustrated in FIG. 3, the digital camera 100 can extract in-focus positions from a pupil-divided light signal. The digital camera 100 having only a common image sensor extracts a position having the highest contrast value as an in-focus position.

The system control unit 210 calculates the contrast value of each image. As an example of a method for calculating the contrast value, the system control unit 210 calculates the luminance Y from color signals Sr, Sg, and Sb of each pixel by using the following Formula 6.

$$Y = 0.299 Sr + 0.587 Sg + 0.114 Sb$$ (Formula 6)

Then, the system control unit 210 calculates a contrast value I by applying a Sobel filter to a 3×3 pixel matrix L of the luminance Y, as represented by the following Formulas 7 to 9.

[Formula 7]

$$I_h = \begin{pmatrix} -1 & 0 & 1 \\ -2 & 0 & 2 \\ -1 & 0 & 1 \end{pmatrix} \cdot L$$ (Formula 7)

[Formula 8]

$$I_v = \begin{pmatrix} -1 & -2 & -1 \\ 0 & 0 & 0 \\ 1 & 2 & 1 \end{pmatrix} \cdot L \quad \text{(Formula 8)}$$

[Formula 9]

$$I = \sqrt{I_h^2 + I_v^2} \quad \text{(Formula 9)}$$

Then, the system control unit 210 selects a pixel having the highest contrast value from the pixels of images having the same coordinates and replaces the coordinate of the combined image with that pixel. The system control unit 210 performs such a replacement on all pixels to generate a combined image in which the entire imaging area is in focus.

However, the above-described combination processing is to be considered as an example, and the present exemplary embodiment is also applicable to combinations that produce images other than a combined image in which the entire imaging area is in focus. For example, the system control unit 210 may perform addition and combination processing, weighted addition and combination process, comparison lighten composition processing, and comparison darken composition processing.

According to the present exemplary embodiment, in the combination of images having a shallow depth of field with which feature point detection is difficult, it is possible to give a conversion coefficient to images for combination having a shallow depth of field by recapturing images for feature point detection and recalculating a conversion coefficient.

Although the above exemplary embodiment has been described above based on a digital camera, some embodiments are not limited to a digital camera. For example, some embodiments nay be embodied in a portable apparatus including an image sensor or a network camera capable of capturing an image.

Some embodiments can also be achieved when a program for implementing at least one of the functions according to the above-described exemplary embodiments is supplied to a system or apparatus via a network or storage medium, and at least one processor in a computer of the system or apparatus reads and executes the program. Further, some embodiments can also be achieved by a circuit (for example, an application specific integrated circuit (ASIC)) for implementing at least one function.

OTHER EMBODIMENTS

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described some exemplary embodiments, it is to be understood that the claims are not limited to the disclosed exemplary embodiments. The scope of the following claims is to be accorded the broadest interpretation so as to encompass all such modifications and equivalent structures and functions.

This application claims priority to Japanese Patent Application No. 2017-215912, which was filed on Nov. 8, 2017 and which is hereby incorporated by reference herein in its entirety.

What is claimed is:

1. An image processing apparatus, comprising:
at least one memory configured to store instructions; and
at least one processor in communication with the at least one memory and configured to execute the instructions to
detect feature points from images in a first plurality of images that at least partially overlap in angle of view and have different focus positions and from the at least one second image;
calculate a first conversion coefficient from the feature points and combine the images in the first plurality of images based on the first conversion coefficient; and
calculate a second conversion coefficient of at least a part of the images in the first plurality of images by using the feature points detected from the at least one second image and combine the at least a part of the images in the first plurality of images by using the second conversion coefficient,
wherein a depth of field in the at least one second image is deeper than a respective depth of field in each image in the first plurality of images, and
wherein the at least one processor executes further instructions not to combine the at least one second image with the images in the first plurality of images.

2. The image processing apparatus according to claim 1, wherein the at least one second image includes a second plurality of images, and
wherein the at least one processor executes further instructions to calculate a conversion coefficient of the images in the second plurality of images by using the feature points detected from the images in the second plurality of images and calculate a conversion coefficient of at least a part of the images in the first plurality of images by using the conversion coefficient of the images in the second plurality of images.

3. The image processing apparatus according to claim 2, wherein a part of the depth of field of each image in the second plurality images partially overlaps a part of the depth of field of at least one other image in the second plurality of images.

4. The image processing apparatus according to claim 1, wherein the depth of field of the at least one second image is deeper than the depth of field of each image in the first plurality of images that was captured with a focus position closest to a focus position of the second image.

5. The image processing apparatus according to claim 4, wherein a range of the depth of field of the at least one second image includes a range of the depth of field of the images in the first plurality of images that were captured with the focus position closest to the focus position of the second image.

6. The image processing apparatus according to claim 1, wherein the at least one second image includes two second images.

7. The image processing apparatus according to claim 6, wherein the two second images were captured with focus positions closer than a closest range of the focus positions of the images in the first plurality images and with focus positions more infinite than a most-infinite range of the focus positions of the images in the first plurality of images.

8. The image processing apparatus according to claim 6, wherein one of the two second images was captured with a focus position on a closest range and another of the two second images was captured with a focus position on a most-infinite range.

9. The image processing apparatus according to claim 1, wherein the at least one processor executes further instructions to calculate a conversion coefficient of the images in the first plurality of images based on the focus positions that were used when the images in the first plurality of images and the at least one second image were captured.

10. The image processing apparatus according to claim 1, wherein focus positions of the images in the first plurality of images are arranged at equal intervals.

11. The image processing apparatus according to claim 1, wherein the at least one processor executes further instructions
to calculate a conversion coefficient of at least a part of the images in the first plurality of images by using the feature points detected from the at least one second image in a case where the depth of field of each image in the first plurality of images is shallower than a threshold value, and
not to calculate a conversion coefficient of any part of the images in the first plurality of images by using the feature points detected from the at least one second image in a case where the depth of field of each image in the first plurality of images is not shallower than the threshold value.

12. An image pickup apparatus, comprising:
a sensor configured to capture a first plurality of images that at least partially overlap in angle of view and have different focus positions and to capture at least one second image;
at least one memory configured to store instructions; and
at least one processor in communication with the at least one memory and configured to execute the instructions
to detect feature points from images in the first plurality of images and from the at least one second image;
calculate a first conversion coefficient from the feature points and combine the images in the first plurality of images based on the first conversion coefficient; and
calculate a second conversion coefficient of at least a part of the images in the first plurality of images by using the feature points detected from the at least one second image and combine the at least a part of the images in the first plurality of images by using the second conversion coefficient,
wherein a depth of field when the sensor captures the at least one second image is deeper than a depth of field when the sensor captures any one of the images in the first plurality of images, and
wherein the at least one processor executes further instructions not to combine the at least one second image with the images in the first plurality of images.

13. An image pickup apparatus, comprising:
a sensor configured to capture a first plurality of images that at least partially overlap in angle of view and have different focus positions;
at least one memory configured to store instructions; and
at least one processor in communication with the at least one memory and configured to execute the instructions
to detect feature points from the images in the first plurality of images,
wherein, in a case where a depth of field of each image in the first plurality of images is shallower than a threshold value, the sensor captures at least one second image,
wherein the at least one processor executes further instructions to calculate a conversion coefficient of at least a part of the images in the first plurality of images by using the feature points detected from the at least one second image and to combine the at least a part of the images in the first plurality of images by using the calculated conversion coefficient, and
wherein the at least one processor executes further instructions not to combine the at least one second image with the images in the first plurality of images.

14. A control method for an image processing apparatus, the method comprising:
detecting feature points from images in a first plurality of images that at least partially overlap in angle of view and have different focus positions and from at least one second image;
calculating a first conversion coefficient from the feature points and combining the images in the first plurality of images based on the first conversion coefficient; and
calculating a second conversion coefficient of at least a part of the images in the first plurality of images by using the feature points detected from the at least one second image and combining the at least a part of the images in the first plurality of images by using the second conversion coefficient,
wherein a depth of field of the at least one second image is deeper than a respective depth of field of each image in the first plurality of images, and
wherein the at least one processor executes further instructions not to combine the at least one second image with the images in the first plurality of images.

15. A non-transitory computer-readable storage medium storing instructions that cause a computer to execute a method, the method comprising:
detecting feature points from images in a first plurality of images that at least partially overlap in angle of view and have different focus positions and from at least one second image;
calculating a first conversion coefficient from the feature points and combining the images in the first plurality of images based on the first conversion coefficient; and
calculating a second conversion coefficient of at least a part of the images in the first plurality of images by using the feature points detected from the at least one second image and combining the at least a part of the images in the first plurality of images by using the second conversion coefficient, wherein a depth of field of the at least one second image is deeper than a respective depth of field of each image in the first plurality of images, and wherein the at least one processor executes further instructions not to combine the at least one second image with the images in the first plurality of images.

\* \* \* \* \*